(12) United States Patent
Stroh et al.

(10) Patent No.: US 9,587,617 B2
(45) Date of Patent: Mar. 7, 2017

(54) METHOD OF SPARK TIMING ADJUSTMENT FOR AN INTERNAL COMBUSTION ENGINE

(71) Applicant: Cummins Inc, Columbus, IN (US)

(72) Inventors: David J. Stroh, Columbus, IN (US); Govindarajan Kothandaraman, Columbus, IN (US); Carlos Alcides Lana, Columbus, IN (US); Karthik Kappaganthu, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 229 days.

(21) Appl. No.: 14/565,882

(22) Filed: Dec. 10, 2014

(65) Prior Publication Data
US 2016/0169186 A1   Jun. 16, 2016

(51) Int. Cl.
*F02P 5/15* (2006.01)
*F02P 9/00* (2006.01)

(52) U.S. Cl.
CPC ............. *F02P 5/1516* (2013.01); *F02P 9/002* (2013.01)

(58) Field of Classification Search
CPC .... F02P 5/15; F02P 5/1516; F02P 9/00; F02P 9/002
See application file for complete search history.

(56) References Cited

U.S. PATENT DOCUMENTS

| | | | |
|---|---|---|---|
| 4,892,074 A * | 1/1990 | Iriyama | F02P 5/1455 123/406.22 |
| 5,673,667 A | 10/1997 | Nakamura | |
| 5,692,473 A | 12/1997 | Thomas et al. | |
| 6,041,756 A | 3/2000 | Bonne | |
| 6,227,182 B1 | 5/2001 | Muraki et al. | |
| 6,948,475 B1 | 9/2005 | Wong et al. | |
| 7,370,633 B2 * | 5/2008 | Kang | F02M 26/01 123/305 |

(Continued)

FOREIGN PATENT DOCUMENTS

| | | |
|---|---|---|
| JP | 2001263119 A | 9/2001 |
| JP | 2008050967 A | 3/2008 |

OTHER PUBLICATIONS

English Language Abstract, JP2001263119A.

(Continued)

*Primary Examiner* — Hieu T Vo
(74) *Attorney, Agent, or Firm* — Taft Stettinius & Hollister LLP

(57) ABSTRACT

Systems and methods are disclosed for adjusting the spark timing of an internal combustion engine. According to at least one aspect of the present disclosure, the system includes an exhaust gas recirculation (EGR) system for recirculating exhaust gas flow from at least one primary EGR cylinder of an engine into an intake system prior to combustion. According to at least one other aspect of the present disclosure, the method includes estimating a dynamic EGR fraction of exhaust gas directed into the intake system via the EGR system, estimating a steady-state EGR fraction of exhaust gas directed into the intake system at the changed mass air flow rate, computing a difference between the dynamic fraction and steady-state fraction to determine a change in EGR fraction, and applying a gain factor to the change in EGR fraction to determine a desired spark timing adjustment.

25 Claims, 8 Drawing Sheets

(56) References Cited

U.S. PATENT DOCUMENTS

| | | |
|---|---|---|
| 8,037,850 B2 | 10/2011 | Pursifull |
| 8,239,122 B2 | 8/2012 | Leone et al. |
| 8,387,591 B2 | 3/2013 | Surnilla et al. |
| 8,726,658 B2 | 5/2014 | Styles et al. |
| 2009/0308070 A1 | 12/2009 | Alger, II et al. |
| 2011/0239997 A1 | 10/2011 | Surnilla et al. |
| 2012/0060497 A1 | 3/2012 | Roth |
| 2012/0316757 A1 | 12/2012 | Yun et al. |
| 2013/0226435 A1 | 8/2013 | Wasberg et al. |
| 2014/0343827 A1 | 11/2014 | Glugla et al. |

OTHER PUBLICATIONS

English Language Abstract, JP2008050967A.
International Search Report and Written Opinion, US/ISA, PCT Application No. PCT/US2015/065019, Feb. 16, 2016, 14 pgs.

\* cited by examiner

METHOD OF SPARK TIMING ADJUSTMENT FOR AN INTERNAL COMBUSTION ENGINE

TECHNICAL FIELD

The present disclosure generally relates to control systems for internal combustion engines and, more specifically, to spark timing control for internal combustion engines using dedicated exhaust gas recirculation.

BACKGROUND

A conventional four-cycle internal combustion engine has four strokes within a single combustion cycle: an intake stroke in which charge gas and fuel are introduced into each combustion cylinder, a compression stroke in which the charge gas and fuel mixture is compressed by the movement of a piston within the cylinder, an expansion stroke in which combustion of the mixture drives the piston and rotates a crankshaft, and an exhaust stroke in which exhaust generated by the combustion of the mixture is forced out of the cylinder by the movement of the piston. Combustion of the mixture is generally initiated by a spark produced by a spark plug associated with the cylinder, and the timing of the spark is critical to the performance of the engine. Spark timing is the process of setting the crankshaft angle at which the spark will fire relative to piston position and crankshaft angular velocity. Typically, for optimal performance, the spark is timed to fire near the end of the compression stroke at some point before the piston reaches the top dead center ("TDC") position to generate maximum cylinder pressure for the expansion stroke. The spark timing must be advanced ahead of TDC because the combustion process and expansion of the resultant exhaust gas take a finite period of time. Accordingly, the crankshaft angular velocity (i.e., engine speed) affects the time frame in which the combustion process should occur to produce optimal power and/or fuel efficiency.

Many factors influence the desired ignition spark timing for a given engine, including the timing of the intake valves or fuel injectors, the type of fuel used, engine speed and load, air and engine temperature, intake air pressure, and other operating conditions. Newer engines typically use an engine control computer with a "spark map" (e.g., lookup table) with spark timing values for all combinations of engine speed and engine load. The control computer sends a signal to an ignition coil at the time indicated in the spark map to fire the spark plug and initiate combustion. However, conventional spark maps are generally based on steady-state conditions of the engine, such as engine speed and mass air flow into the engine. Consequently, changes in engine operating conditions, such as changes in the mass air flow, create periods of inefficient operation until a new steady-state condition is reached.

Under certain operating conditions, the appropriate spark timing for optimal power and/or fuel efficiency provided by the spark map can be counter-productive, producing an abnormal combustion process, including misfires and/or engine knock. "Knock" occurs when the mixture of fuel and charge gas burned in the engine generates such high combustion temperatures that one or more pockets of the mixture explode outside the envelope of the combustion flame front. Effects of engine knock range from inconsequential to completely destructive.

Knock may be attenuated by various methods, including among others retarding the spark timing (i.e., delaying spark timing until closer to TDC) and the use of exhaust gas recirculation. However, retarding the spark timing tends to decrease engine power and efficiency. Exhaust gas recirculation tends to lower combustion temperatures by replacing some of the oxygen (i.e., air) in the cylinder with mostly inert exhaust gas, which has a higher thermal capacitance than air and further suppresses combustion temperatures. Exhaust gas recirculation may also slow the combustion process, which affects the optimal spark timing. Further, exhaust gas recirculation generally does not respond quickly enough to prevent knock when the engine operating conditions change rapidly, for instance, when engine speed and mass air flow into the engine change in response to operator demand.

The issue of knock or misfire during transients is further more complex in internal combustion engines with dedicated exhaust gas recirculation. In dedicated exhaust gas recirculation architectures, the exhaust from one or more dedicated cylinders is routed directly to the inlet flow of the engine such that all the exhaust gas from these cylinders is pushed into the intake. Because generally no control valve is used in such a configuration, the amount of exhaust gas recirculation going back into the cylinders is unregulated and hence can vary more during transients. A conventional spark timing command based on a pre-determined table leads to an increased propensity for knock or misfire. Accordingly, there remains a need for further contributions in this area of technology to spark timing under such changing conditions.

SUMMARY

Systems and methods are disclosed for adjusting the spark timing of an internal combustion engine. According to at least one aspect of the present disclosure, the system includes an exhaust gas recirculation (EGR) system for recirculating exhaust gas flow from at least one primary EGR cylinder of an engine into an intake system prior to combustion. According to at least one other aspect of the present disclosure, the method includes estimating a dynamic EGR fraction of exhaust gas directed into the intake system via the EGR system, estimating a steady-state EGR fraction of exhaust gas directed into the intake system at the changed mass air flow rate, computing a difference between the dynamic fraction and steady-state fraction to determine a change in EGR fraction, and applying a gain factor to the change in EGR fraction to determine desired spark timing adjustment.

This summary is provided to introduce a selection of concepts that are further described herein in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

Figure 1:
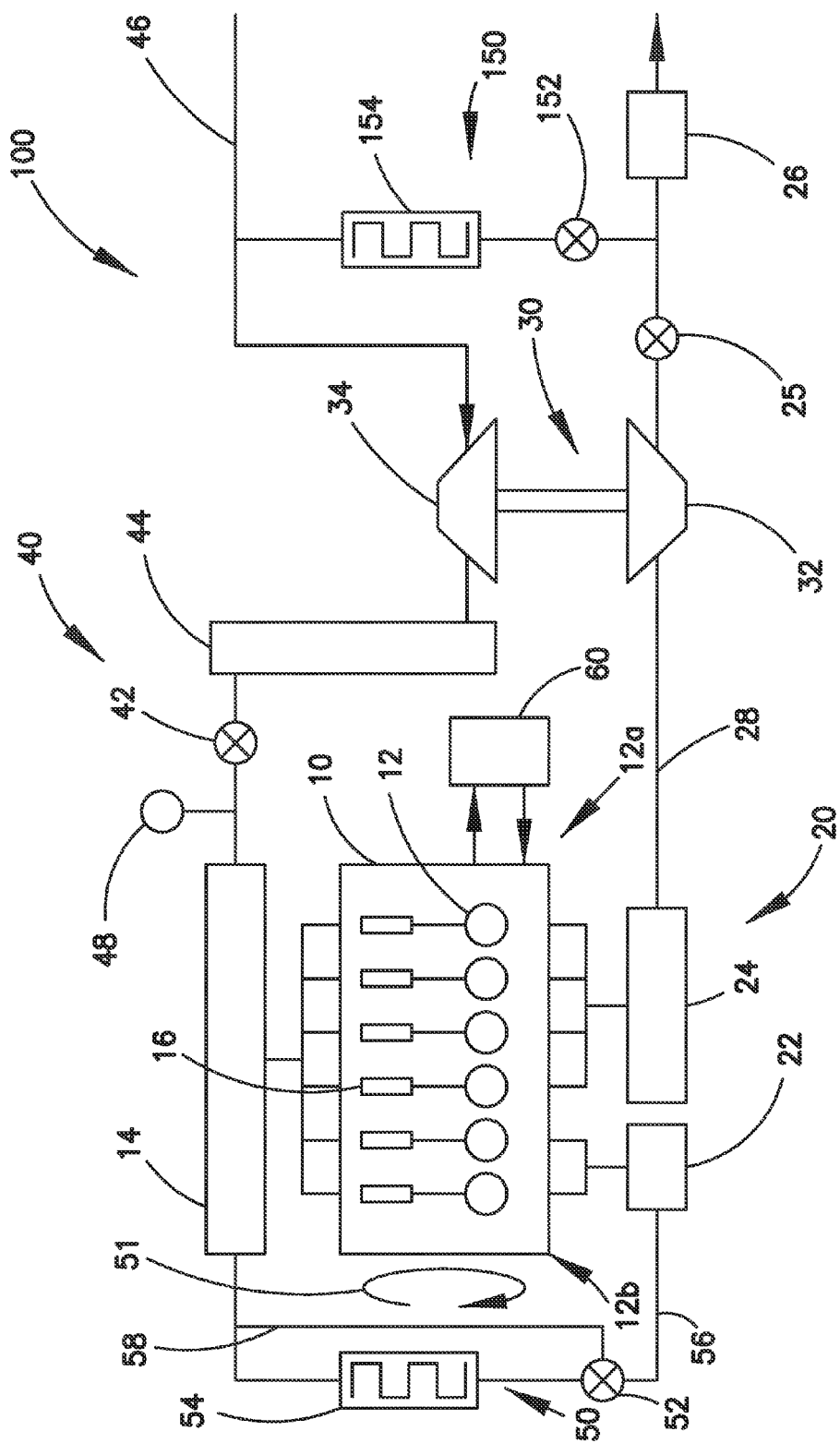
FIG. 1 is a schematic block diagram of an embodiment of an engine system according to the present disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the invention as illustrated therein as would normally occur to one skilled in the art to which the invention relates, having the benefit of the present disclosure, are contemplated herein.

One aspect of the present disclosure describes methods of improving the performance of an internal combustion engine and, in particular, an internal combustion engine employing a dedicated exhaust gas recirculation ("EGR") system. The systems and methods disclosed enable adjustments of the ignition spark timing of the engine in response to transient changes in the intake mass air flow rate (i.e., throttle position). Such transients may cause combustion misfires and engine knock due to the time lag of the EGR system relative to the intake flow system. The disclosed systems and methods anticipate the delayed response of the EGR system and adjust spark timing accordingly, thereby preempting a misfire and/or knock condition and further enabling the engine to more quickly return to an efficient steady-state spark timing post-transient.

According to at least one embodiment of the present disclosure as shown in FIG. 1, an engine system 100 may include an engine 10 fluidly coupled to an intake system 40 and an exhaust system 20. The engine 10 may be any type of internal combustion engine, including at least a spark-ignition engine that uses gasoline, alcohol (e.g., ethanol), natural gas engine, and/or combinations thereof as a fuel. The engine 10 may comprise a portion of a powertrain for a vehicle, including a mechanical transmission (not shown) to transfer motive power generated by the engine 10 to the vehicle. In certain embodiments, the engine 10 may comprise a portion of a stationary application such as power generation, drilling, or pumping applications. The engine 10 includes a plurality of combustion chambers or cylinders 12 structured to enable and contain a combustion process, in which a mixture of the fuel and air may be burned to produce mechanical power (e.g., motive power for the vehicle) via the mechanics of the engine 10.

The engine 10 may include a plurality of fuel injectors (not shown) in fluid communication with the cylinders 12 to introduce a prescribed amount of fuel into the cylinders 12 to enable the combustion process. In certain embodiments, the engine 10 may include one injector for each cylinder 12. In alternative embodiments, the engine 10 may include fewer or more injectors than cylinders 12. Each cylinder 12 of the engine 10 may further include an igniter 16 at least partially disposed within each cylinder 12 and structured to initiate combustion of the prescribed amount of fuel. The igniter 16 may be a spark plug or other suitable ignition device configured to fire on command. Further, the engine 10 may include a plurality of cylinder valves (not shown) moveably connected to the cylinders 12 to control the flow of charge gas into and exhaust gas out of the cylinders 12.

The intake system 40 may include an intake line 46, which may include a filter (not shown) to filter incoming ambient air being inducted into the engine 10. The intake system 40 may include an intake manifold 14 in fluid communication with the intake line 46 and the cylinders 12, such that the intake manifold 14 can distribute the intake flow of charge gas from the intake line 46 into each of the cylinders 12 via the cylinder valves. The intake system 40 may further include a throttle valve 42 disposed upstream of the intake manifold 14. The throttle valve 42 is structured to control the intake flow of charge gas in response to a load demand from an operator using the engine system 100 and/or a controller. Accordingly, the throttle valve 42 may control the mass air flow rate (often abbreviated "MAF") of charge gas into the intake manifold 14. The intake flow of charge gas may include ambient air, compressed air, recirculated exhaust gas, and other gases as described further herein. In certain embodiments, the throttle valve 42 controls mass air flow rate of fresh ambient air into the intake manifold 14. In at least one embodiment, instead of the throttle valve 42, the mass air flow rate may be controlled by a variable valve lift system (not shown) of the engine 10. The intake system 40 may further include a mass air flow rate ("MAF") sensor 48 in fluid communication with the intake line 46. The MAF sensor 48 may be any suitable type of flow sensor, including a vane meter or hot wire sensor, structured to measure the flow rate through the intake system 40. The intake system 40 may further include a charge air cooler 44 disposed upstream of the throttle valve 42 to cool, and thereby raise the density of, the intake flow of charge gas.

The exhaust system 20 is structured to enable the flow of post-combustion exhaust gas from at least a portion of the cylinders 12 to the surrounding environment via the cylinder valves. In at least one embodiment, the engine 10 is a "dedicated EGR" engine. In such embodiments, post-combustion exhaust gas generated in a specific, dedicated portion of the cylinders 12 is recirculated into the intake manifold 14, while post-combustion exhaust gas generated in the other cylinders 12 of the engine 10 is discharged through the exhaust system 20 to the surrounding environment. Accordingly, the exhaust system 20 may include an exhaust manifold 24 in fluid communication with an exhaust bank 12a of the cylinders 12 of the engine 10. The exhaust bank 12a comprises at least a portion, and generally the majority, of the cylinders 12. The exhaust system 20 may further include an EGR manifold 22 in fluid communication with at least another portion of the cylinders 12 of the engine 10. The EGR manifold 22 may be in fluid communication with a bank of primary EGR cylinders 12b (i.e., the dedicated EGR cylinders). Though the primary EGR cylinders 12b may be primarily dedicated to supplying the exhaust gas to the intake manifold 14, certain embodiments of the engine system 100 may include a bleed over valve (not shown) or similar bypass to enable exhaust gas from the primary EGR cylinders 12b to enter the exhaust system 20.

Though the engine 10 shown in FIG. 1 includes six cylinders 12 with four cylinders in the exhaust bank 12a and the remaining two cylinders being the primary EGR cylinders 12b, the engine 10 may include any number of cylinders 12. Moreover, the exhaust bank 12a and primary EGR cylinders 12b may have greater or fewer numbers of associated cylinders 12. For example, the engine 10 may include eight cylinders 12, including seven cylinders 12 of the exhaust bank 12a, each in fluid communication with the exhaust manifold 24, and one primary EGR cylinder 12b in fluid communication with the EGR manifold 22.

The EGR manifold 22 enables the flow of post-combustion exhaust gas from the primary EGR cylinders 12b to be recirculated into the intake manifold 14 via an EGR system 50 as shown in FIG. 1. The EGR system 50 may include an EGR line 56 fluidly connecting the EGR manifold 22 to the intake manifold 14. Exhaust gas routed back into the engine 10 via the EGR system 50 may be referred to as "EGR gas" and, thus, comprises a portion of the charge gas in certain embodiments. The EGR system 50 may include an EGR valve 52 structured to regulate and synchronize the flow of exhaust gas through the EGR system 50. The EGR system 50 may further include an EGR cooler 54 structured to transfer heat from the exhaust gases routed therethrough. The EGR cooler 54 may be any type of suitable heat exchanger and, by cooling the exhaust gases flowing through the EGR system 50, may increase the mass of the EGR gas routed back into the intake manifold 14. In at least one embodiment, the EGR system 50 may include a bypass line 58 to selectively bypass the EGR cooler 154 and route uncooled EGR gas to the intake manifold 14 as desired. Alternatively, in certain embodiments, the EGR system 50 may not include the EGR cooler 54. Consequently, components of the engine system 100 in fluid communication with the EGR system 50 comprise an EGR loop 51, which in certain embodiments may include the EGR manifold 22, the EGR line 56, the EGR cooler 54, the intake manifold 14, and the primary EGR cylinders 12b.

As shown in FIG. 1, the exhaust system 20 may further include an after treatment unit 26 structured to eliminate, or at least reduce, unwanted regulated emissions from the exhaust gas flowing therethrough. The emissions may include gaseous and solid compounds, including carbon monoxide (CO), unburned hydrocarbons ("UHCs"), oxides of nitrogen (hereafter "NOx" to include nitric oxide (NO) and nitrogen dioxide ($NO_2$)), particulate matter ("PM") such as soot, and sulfur compounds among others. The aftertreatment unit 26 of the exhaust system 20 may include any suitable aftertreatment component, including one or more of a diesel oxidation catalyst ("DOC"), three-way catalyst ("TWC"), lean NOx catalyst, selective catalytic reduction ("SCR") catalyst, a filtration component, either catalyzed or uncatalyzed (e.g., a diesel particulate filter ("DPF")), and a cleanup catalyst (e.g., an ammonia oxidation catalyst), collectively referred to as aftertreatment components. Moreover, the aftertreatment unit 26 may include more than one of the named aftertreatment components and/or, alternatively, other appropriate components such as catalysts, filters, adsorbents, and other devices, to remove regulated emissions from the exhaust gas and thereby comply with the applicable regulatory exhaust emission standards. The aftertreatment unit 26 may be in fluid communication with the exhaust manifold 24 via an exhaust line 28. The exhaust system 20 may further include an exhaust valve 25 disposed in the exhaust line 28 and structured to control the flow of exhaust gas through the exhaust system 20.

In at least one embodiment according to the present disclosure, the engine system 100 may include a turbocharger 30 in communication with the exhaust system 20 and the intake system 40 as shown in FIG. 1. The turbocharger 30 may include a turbine 32 in fluid communication with the exhaust line 28 and the flow of exhaust gas exiting the exhaust manifold 24. The turbine 32 may be disposed upstream of the aftertreatment unit 26 and be structured to convert at least a portion of the energy of the relatively hot and high pressure exhaust gas into a mechanical torque. The turbocharger 30 may further include a compressor 34 in fluid communication with the flow of charge gases upstream of the intake manifold 14 and driven by the torque generated by the turbine 32. The compressor 34 may be structured to compress the charge gas and push an increased mass of charge gas through the intake manifold 14 and into the cylinders 12, thereby increasing the power output of the engine 10 in proportion to the mass of the charge gas pushed into the cylinders 12. The turbocharger 30 may include, but not be limited to, a multiple stage turbocharger, a variable geometry turbocharger (VGT), or a turbocharger having a wastegate or bypass valve in certain embodiments. Additionally or alternatively, the engine system 100 may include a mechanically driven supercharger (not shown) in communication with the intake system 40 and capable of pushing compressed charge gas through the intake manifold 14 and into the engine 10.

In at least one embodiment according to the present disclosure, the engine system 100 may include a low pressure ("LP") EGR system 150. As shown in FIG. 1, the LP EGR system 150 may include an LP EGR valve 152 structured to regulate and synchronize the flow of exhaust gas through the LP EGR system 150. The LP EGR system 150 may further include an LP EGR cooler 154 structured to transfer heat from the exhaust gases routed therethrough. The LP EGR system 150 may be disposed between the exhaust system 20 and the intake system 40 downstream of the turbine 32 of the turbocharger 30 and upstream of the compressor 34. Though depicted as being upstream of the aftertreatment system 26 in FIG. 1, in certain embodiments the LP EGR system 150 may be disposed downstream of the aftertreatment system 26.

In at least one embodiment according to the present disclosure as shown in FIG. 1, the engine system 100 may include a controller 60 in communication with the engine 10, the controller 60 structured to perform certain operations to control the functions of the engine system 100. For example, the controller 60 may be structured to command operations to adjust the ignition spark timing of the engine 10 during intake flow transients to improve efficiency and avoid misfire and knock in the engine 10. The controller 60 may be configured to control command parameters of the engine 10, which may include operational settings for those components of the engine system 100 that may be controlled with an actuator activated by the controller 60. For example, the controller 60 may be in communication with, and thereby control, the exhaust valve 25, throttle valve 42, and EGR valve 52. In certain embodiments, the controller 60 may be a portion of a processing system including one or more computing devices having memory, processing, and communication hardware. The controller 60 may be a single device or a distributed device, and the functions of the controller 60 may be performed by hardware or software. The controller 60 may comprise digital circuitry, analog circuitry, or a hybrid combination of both of these types. The controller 60 may include one or more Arithmetic Logic Units (ALUs), Central Processing Units (CPUs), memories, limiters, conditioners, filters, format converters, or the like which are not shown to preserve clarity.

Further, the controller 60 may be programmable, an integrated state machine, or a hybrid combination thereof. In at least one embodiment, the controller 60 is programmable and executes algorithms and processes data in accordance with operating logic that is defined by programming instructions such as software or firmware. Alternatively or additionally, operating logic for the controller 60 may be at least partially defined by hardwired logic or other hardware. It should be appreciated that the controller 60 may be dedicated exclusively to improving the performance of the aftertreatment system 30 or may further be used in the regulation, control, and/or activation of one or more other systems or aspects of the engine system 100.

In certain embodiments, the controller 60 includes one or more modules structured to functionally execute the operations of the controller 60. The description herein including modules emphasizes the structural independence of the aspects of the controller 60, and illustrates one grouping of operations and responsibilities of the controller 60. Other groupings that execute similar overall operations are understood within the scope of the present disclosure. Modules may be implemented in hardware and/or software on a non-transient computer readable storage medium, and modules may be distributed across various hardware or software components.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figures 2A, 2B:
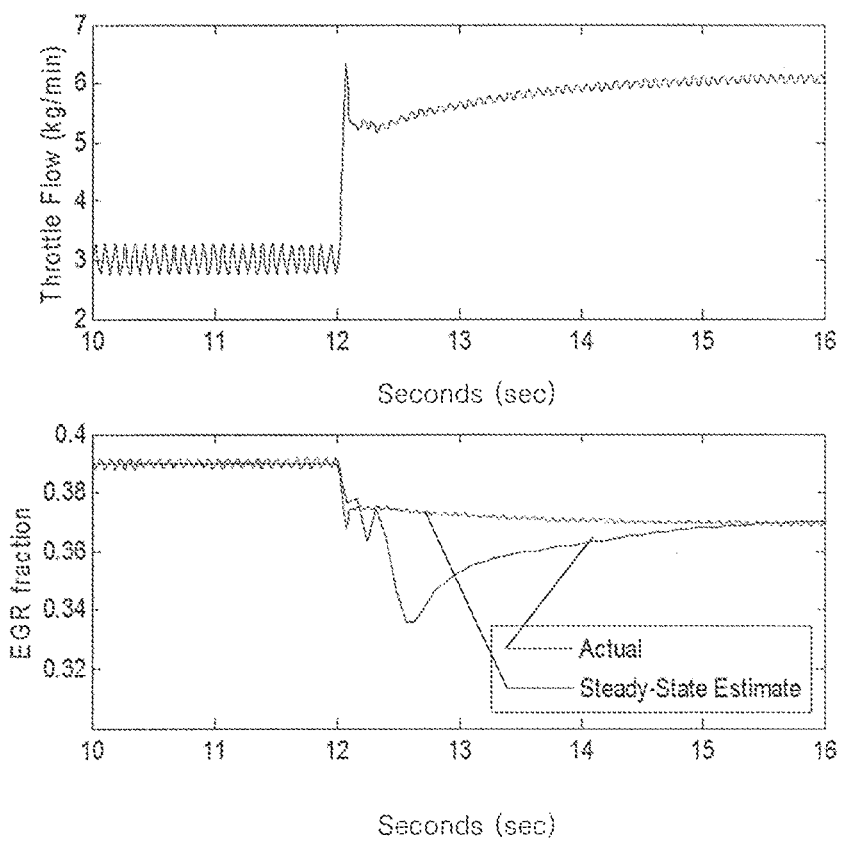
FIG. 2A is a plot of mass air flow rate in kilograms per minute (kg/min) over a time period (sec) for a conventional engine.
FIG. 2B is a plot of the fraction of recirculated exhaust gas comprising the charge gas introduced into a conventional engine over the same time period (sec) as FIG. 2A.

The engine system 100 is structured to adjust the ignition spark timing of the engine 10 during intake flow transients to improve efficiency and avoid misfire and knock conditions in the engine 10. By way of background and comparison, FIGS. 2A and 2B depict the response of a conventional engine employing a dedicated EGR system to changes (i.e., transients) in intake flow into the engine over a time period. FIG. 2A illustrates an intake throttle transient in which the mass air flow rate through a throttle is roughly doubled nearly instantaneously in response to an operator input, for example a driver quickly depressing an accelerator pedal connected to the engine. FIG. 2B illustrates the dedicated EGR system step response to the throttle input of FIG. 2A. FIG. 2B shows two response curves. One is the estimated steady-state EGR fraction for the new throttle flow value (labeled "Steady-state estimate"), where the EGR fraction is the proportion of EGR gas comprising the intake flow into the engine. The estimated steady-state EGR fraction is the desired or expected EGR fraction for a given intake flow rate under steady-state conditions. The estimated steady-state EGR fraction may be determined from empirical data of the engine operating under steady-state conditions or from a model based on such operating conditions.

The other response curve illustrated in FIG. 2B is an actual EGR fraction (labeled "Actual") for the conventional engine in response to the transient throttle flow input of FIG. 2A. As shown in FIG. 2B, the actual EGR fraction lags the steady-state EGR fraction estimate, initially dropping as the throttle flow jumps and then approaching the steady-state value relatively slowly. The relatively slow response of the actual EGR fraction to changes in throttle flow generally resembles an overly-damped response to the step input of FIG. 2A that is due to volumetric and pressure differences between the EGR system and the intake system of the conventional engine.

As an example of the volumetric differences, referring to FIG. 1, the response of the EGR system providing the EGR fraction is affected by the total volume of the EGR loop 51, which may include the EGR manifold 22, the EGR line 56, the EGR cooler 54, and the intake manifold 14, and the primary EGR cylinders 12b. Based on the air-handling architecture, the total volume of the intake system 40 may include the intake line 46, the charge cooler 44, and the intake manifold 14. Consequently these volumes introduce filling dynamics that contribute to the transient response characteristics exhibited in FIG. 2B.

Regarding the pressure differences between the EGR system 50 and the intake system 40, the flow rate of gases through the cylinders 12 of the engine 10 is largely driven by the pressure differential across the cylinders 12 from the intake manifold 14 to the exhaust manifold 24 and EGR manifold 22. The EGR system 50 and the intake system 40 share the intake manifold 14 and its pressure upstream of the cylinders 12. The pressures of the exhaust manifold 24 and EGR manifold 22 are typically not the same during operation of the engine 10. Moreover, the pressures of the exhaust manifold 24 and EGR manifold 22 typically do not change in sync with one another due to the pressure and volumetric effects. Therefore, the pressure effects within the EGR system 50 generally lag those of the intake system 40, which causes changes in the EGR fraction to lag changes in the mass air flow rate.

Further, because the EGR gas generated within the primary EGR cylinders 12b does not escape the engine system 100 and because the EGR loop 51 shares only the intake manifold pressure with the intake system 40 and the exhaust bank 12a, the primary EGR cylinders 12b may have alternative combustion processes and compression ratios than the exhaust bank 12a. For example, since the cylinders 12 fire in a predetermined order, and since the primary EGR cylinders 12b comprise less than all the cylinders 12, the number of pulses of exhaust flow from the primary EGR cylinder 12b are less than the number of pulses of intake flow required by all the cylinders 12 in any given sequence in which all the cylinders 12 are fired. Consequently, the flow conditions within the EGR loop 51 may vary significantly from the remainder of the engine system 100.

Because of the foregoing volumetric and pressure differences, the mass flow rate of EGR gas through the EGR system 50 is not commanded and, thus, not controlled the way the mass air flow rate can be commanded by adjusting the throttle 42, for example. Though the mass flow rate of EGR gas through the EGR system 50 may be at least partially regulated via the EGR valve 52, the volumetric and pressure effects driving the flow of EGR gas dominate. Consequently, the mass flow rate of EGR gas, and therefore the EGR fraction, merely respond to changes in the pressures with the engine system 100 and are not controlled to a specific desired value regardless of the pressure within the intake manifold 14, for instance.

Figures 3A, 3B, 3C:
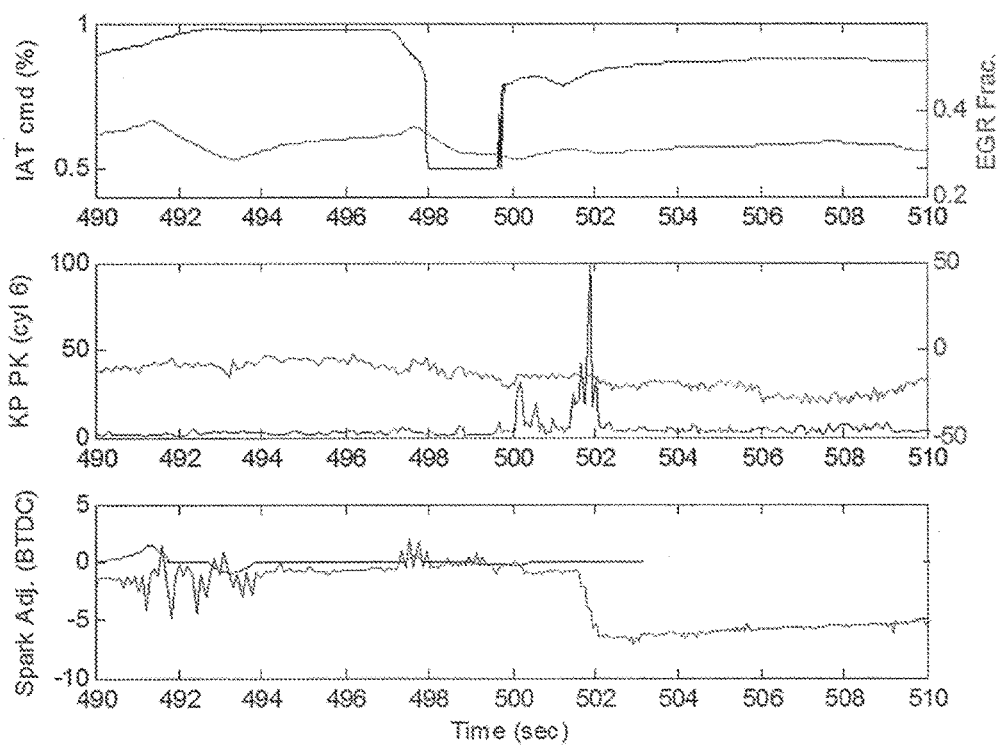
FIG. 3A is a combination plot of the percentage of a throttle position commanded and of the fraction of recirculated exhaust gas comprising the charge gas introduced into a conventional engine over a time period (sec)
FIG. 3B is a plot of occurrences of engine knock as measured by a knock parameter ("KP PK") in a conventional engine over the same time period (sec) as FIG. 3A.
FIG. 3C is a plot of the spark timing adjustment in crank angle degrees (BTDC) in a conventional engine over the same time period (sec) as FIG. 3A.

The relatively slow response of the EGR system 50 to changing operating conditions of the engine 10 causes various performance issues, including engine knock, misfires, and reduced fuel efficiency. For example, FIGS. 3A-3C show the response of a conventional six-cylinder engine using dedicated exhaust gas recirculation to a transient in the mass air flow rate due to a transient change in an intake throttle command. FIG. 3A depicts the intake air throttle command (labeled "IAT cmd") changing from nearly wide open (i.e., 100%), down to about 50% open, and back up to about 80% over a 2-4 second period (i.e., 498-502 sec.). FIG. 3A further shows the drop in EGR fraction (labeled "EGR Frac.") that results from the transient intake throttle command. FIG. 3B shows the occurrence of multiple knock events over the same operating period as FIG. 3A presented in terms of a knock parameter (labeled "KP PK"). The spikes in the knock parameter from about 500-502 sec. indicate engine knock occurring as a result of the fluctuation in intake air throttle command and the corresponding drop in EGR fraction that follows.

FIG. 3C shows a conventional spark timing adjustment made in response to the transient in the intake air throttle command to mitigate the knock condition observed in FIG. 3B. Because conventional spark timing adjustments are generally based on steady-state conditions of engine speed and mass air flow into the engine, the spark adjustment depicted in FIG. 3C demonstrates two undesirable features: 1) the spark adjustment lags the throttle transient and the start of the knock condition, thereby failing to prevent the onset of knock; and 2) the spark adjustment does not immediately return to its original timing once the transient in the intake air throttle command has passed. The first undesirable feature means that the conventional spark adjustment, based only on steady-state engine speed and mass air flow rate, cannot be implemented quickly enough to prevent the knock condition, and a sequence of knocks is observed before the spark timing is adjusted. The conventional engine essentially misses the transient and responses varying pressure disturbance in the system. Consequently, conventional spark adjustment merely mitigates or shortens the knock condition but does not prevent the onset of the knock condition.

The second undesirable feature is the duration of the spark adjustment after the intake air throttle and EGR fraction have returned to their pre-transient states. As described herein, spark timing has a significant effect on the performance of an engine, both in terms of power output and fuel efficiency. To retard spark timing is to lower the efficiency of the engine. As shown in FIG. 3C, a conventional spark adjustment may last many engine cycles (e.g., several seconds from about 502 sec. to at least 510 sec.) longer than necessary in response to a transient throttle condition. The persistence of the conventional spark adjustment, which is caused by the traditional spark map dependence on steady-state operating conditions, degrades engine performance. Moreover, under operating conditions including multiple transients over varying periods, conventional spark adjustment may continually lag in response, resulting in both engine knock and poor engine performance, such as surging.

Figure 4:
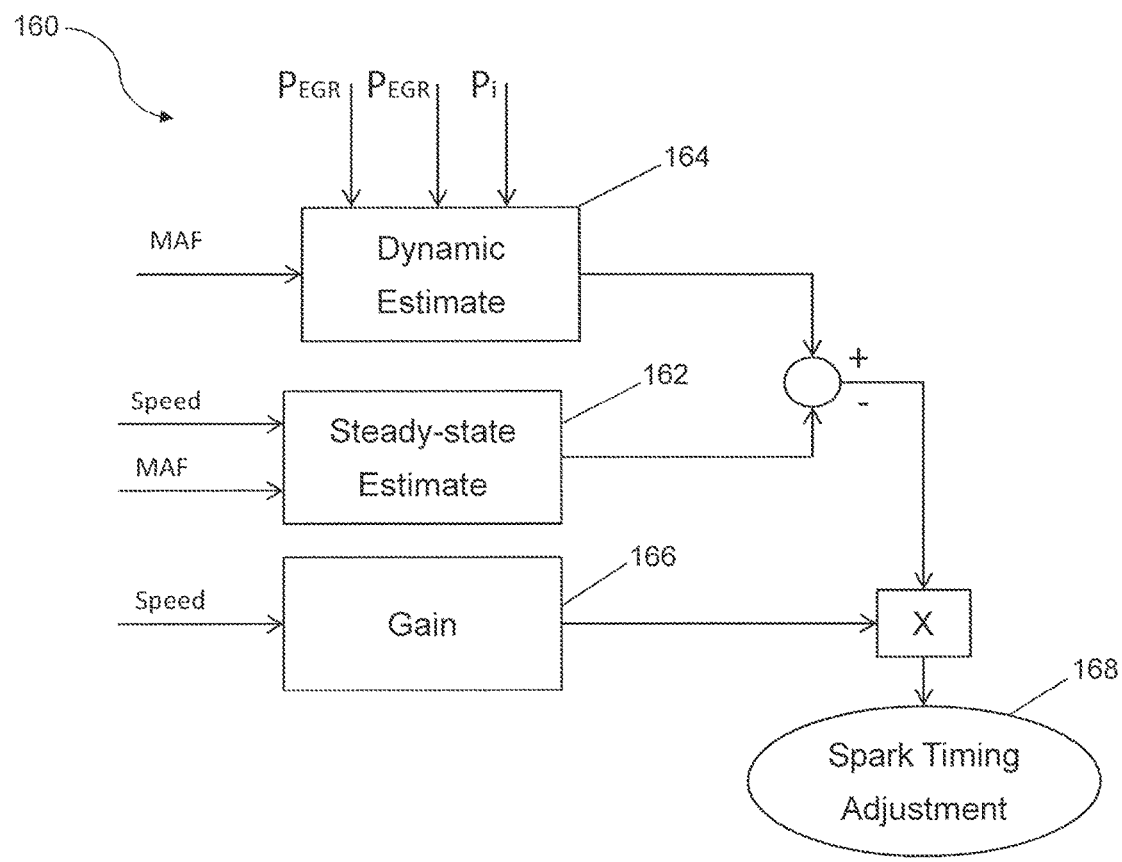
FIG. 4 is a schematic block diagram of an embodiment of a dynamic spark timing adjustment model of an engine system according to the present disclosure.

In contrast to conventional engines, the engine system 100 can prevent engine knock and mitigate periods of reduced performance in response to transients of the mass air flow rate. The engine system 100 includes a control scheme that uses a dynamic spark timing adjustment model 160 ("the spark model 160") to anticipate changes in the EGR fraction and to make appropriate changes to the spark timing to mitigate knock and misfire conditions in the engine 10. One embodiment of the spark model 160 according to the present disclosure is shown in FIG. 4. As shown in FIG. 4, the spark model 160 may include a steady-state model of EGR fraction 162 ("steady-state model 162"), a dynamic model of EGR fraction 164 ("dynamic model 164"), and a gain factor 166 to determine a spark timing adjustment value 168. In such an embodiment, the spark model 160 generates the spark timing adjustment value 168 by determining an estimated change in EGR fraction from an estimate of the dynamic EGR fraction (i.e., the dynamic model 164) relative to the steady-state EGR fraction (i.e., the steady-state model 162) at the current operating condition (e.g., engine speed and mass air flow rate) and by determining a desired adjustment to the spark timing (i.e., spark timing adjustment value 168) for the resultant estimated change of EGR fraction by applying a gain factor for the change in spark timing for a given change in EGR fraction (i.e., the gain factor 166). The engine system 100 may then use the spark timing adjustment value 168 provided by the spark model 160 to adjust spark timing accordingly to prevent knock and/or misfire caused by the actual change in EGR fraction. The spark timing adjustment value 168 may be a crank angle before TDC at which the igniters 16 of the engine 10 will fire.

The steady-state model 162 uses various input parameters to predict or approximate the steady-state EGR fraction that will result from the transient changes of pressure in the EGR system 50 and intake manifold 14 produced by the transient change in the mass air flow rate. As noted herein, the mass flow rate of EGR gas, and thus EGR fraction, is not commanded. Therefore, the steady-state EGR fraction represents the anticipated EGR fraction in the intake manifold 14 subsequent to the change in the mass air flow rate (i.e., at the current engine speed and mass air flow rate of fresh air into the intake manifold 14) once the flow through the EGR system has come to steady-state.

In contrast, the dynamic model 164 uses various input parameters to predict or approximate the dynamic change in the EGR fraction during the transient changes of pressure in the intake manifold 14, accounting for the volumetric and pressure effects described herein that cause the response of the EGR loop 51 to lag the transient. Accordingly, the dynamic model 164 estimates the time dependent response of the EGR system 50 and enables the development of a spark timing adjustment appropriate for the period between the occurrence of the transient and the subsequent steady-state condition.

The spark model 160, including the steady-state model 162, dynamic model 164, and gain factor 166, may be based on first-principle physics-based models, on regression models of empirical data over the range of operating conditions of the engine system 100, or on filters that may use regression models from empirical data of the current operating condition as modified by the conditions of one or more time steps before the current condition.

The spark model 160 uses various inputs to estimate the EGR fraction for the given operating conditions in order to anticipate the change in EGR fraction resulting from transients in the intake flow, such as the EGR fraction changes shown in FIGS. 2 and 3A. Accordingly, the steady-state estimate 162, dynamic estimate 164, gain factor 166 may be based on inputs, including but not limited to the mass air flow rate into the engine 10, engine speed, rate of change of engine speed, engine load (either measured or estimated), mass EGR flow rate, the amount of internal EGR (i.e., residual exhaust gas in the cylinder from variable valve timing, a variable geometry turbocharger, or other suitable means), mass flow rate of the charge gas (i.e., both ambient air flow and EGR), rate of change of mass air flow rate, rate of change of throttle position, pressure in the EGR manifold 22 or the exhaust manifold 24, rate of change of pressure in the EGR manifold 22 or the exhaust manifold 24, fueling rate, fueling rate specifically in the primary EGR cylinders 12b, turbocharger speed, rate of change of turbocharger speed, and the type of fuel used. In certain embodiments, the steady-state estimate 162 and dynamic estimate 164 may be based on other factors, such as measured or estimated concentrations of specific species (e.g., oxygen, carbon monoxide, carbon dioxide, and hydrogen) present in the EGR gas. In at least one embodiment, the steady-state model 162 and dynamic model 164 may be based on real-time measurements of the EGR flow rate through the EGR system 50 from a flow sensor (not shown); however, such a sensor may increase the cost of the engine system 100. Accordingly, the steady-state estimate 162, dynamic estimate 164, gain factor 166 may be based on any suitable parameter of engine performance that affects the amount of EGR gas in the cylinders 12.

In the embodiment shown in FIG. 4, the steady-state estimate 162 may use inputs for engine speed and mass air flow rate. In such an embodiment, the steady-state estimate 162 may predict or approximate the EGR fraction corresponding to the current engine speed (labeled "Speed") and mass air flow rate of fresh air (labeled "MAF") into the intake manifold 14. Moreover, the dynamic estimate 164 may use a pressure in the EGR system 50 (labeled "$P_{EGR}$"), a rate of change of the pressure in the EGR system 50 (labeled "$\dot{P}_{EGR}$"), a pressure in the intake manifold 14 (labeled "Pi"), and the mass air flow rate into the engine 10 to predict or approximate a change in EGR fraction resulting from the current pressures and changes in pressure in the EGR loop 51 and the fresh air flow. The different EGR fractions provided by the steady-state estimate 162 and dynamic estimate 164 may then be combined, either additively or multiplicatively, to yield the estimated change in EGR fraction. For example, the estimated change in EGR fraction may be calculated as an addition, subtraction, percentage, or factorial of the steady-state estimate 162. As shown in FIG. 4, the resulting estimated change in EGR fraction may be converted into a spark timing adjustment value 168 by applying the gain factor 166, based on an engine speed input. Accordingly, the gain factor 166 may comprise a desired change in spark timing for a given change in EGR fraction. In certain embodiments, the gain factor 166 may be further based on other engine parameters as described herein.

Figure 5:
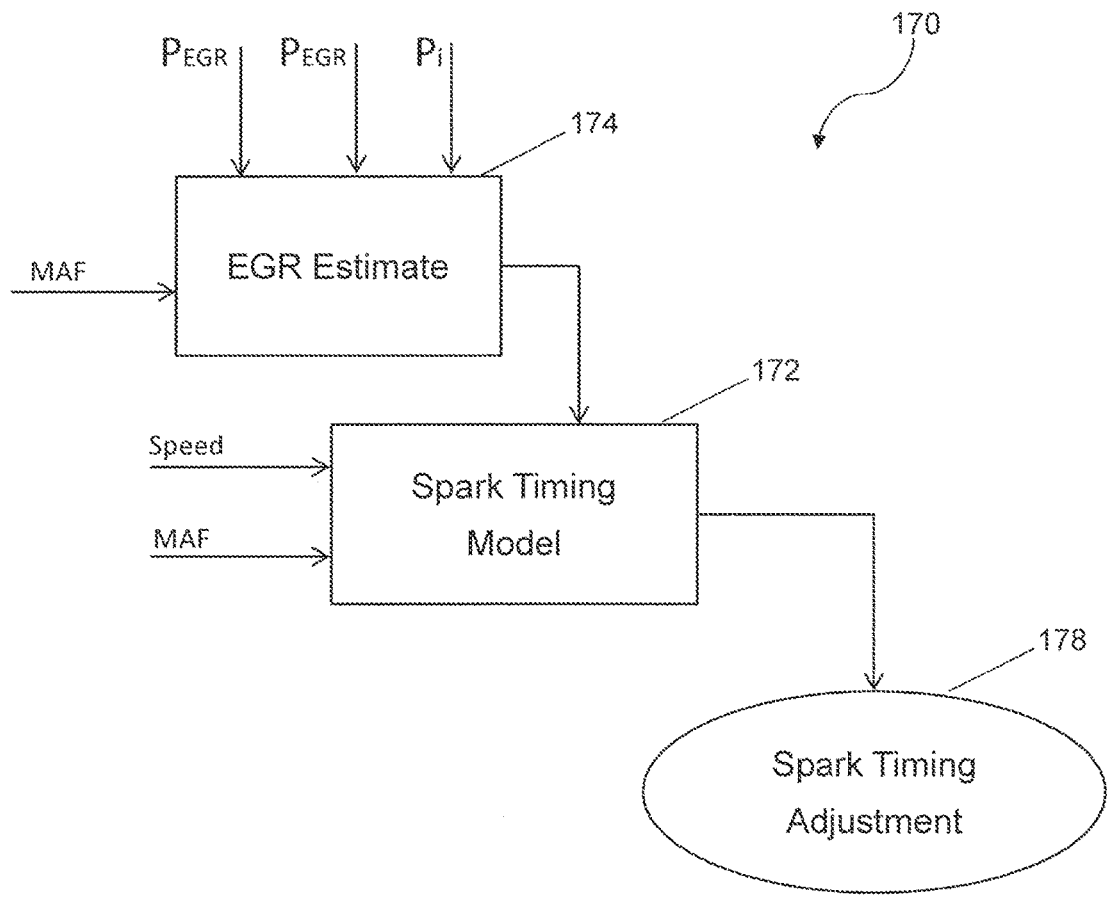
FIG. 5 is a schematic block diagram of an alternative embodiment of a dynamic spark timing adjustment model of an engine system according to the present disclosure.

According to at least one embodiment of the present disclosure, the engine system 100 may include an alternative embodiment of the spark model 160, a dynamic spark timing adjustment model 170 ("the spark model 170") as shown in FIG. 5. The spark model 170 may use estimates or measurements of the absolute EGR fraction, instead of the change in EGR fraction as used in the spark model 160, to determine a desired spark timing adjustment value 178. Accordingly, the spark model 170 may include a model of EGR fraction 174 ("EGR estimate 174") and a spark timing model 172.

The EGR estimate 174 uses various input parameters to predict or approximate the total or absolute EGR fraction that will result from the transient changes of pressure in the EGR system 50 and intake manifold 14 produced by the transient change in the mass air flow rate. The absolute EGR fraction represents the anticipated EGR fraction in the intake manifold 14 at each time step subsequent to the change in the mass air flow rate (i.e., at the current engine speed and mass air flow rate). Accordingly, the absolute EGR estimate combines aspects of the dynamic estimate 164 and steady-state estimate 162. The spark timing model 172 uses various input parameters to determine a desired absolute spark timing or spark timing adjustment for the current operating conditions of the engine 10, including the estimated EGR fraction.

The spark model 170, including the spark timing model 172 and EGR estimate 174, may be based on first-principle physics-based models, on regression models of empirical data over the range of operating conditions of the engine system 100, or on filters that may use regression models from empirical data of the current operating condition as modified by the conditions of one or more time steps before the current condition. The spark timing adjustment value 178 may be a crank angle before TDC at which the igniters 16 of the engine 10 will fire.

The spark model 170 uses various inputs to estimate the EGR fraction for the given operating conditions in order to anticipate the change in EGR fraction resulting from transients in the intake flow, such as the EGR fraction changes shown in FIGS. 2 and 3A. Accordingly, the spark timing model 172 and dynamic estimate 174 may be based on various inputs, including but not limited to the mass air flow rate into the engine 10, engine speed, rate of change of engine speed, engine load (either measured or estimated), mass EGR flow rate, the amount of internal EGR (i.e., residual exhaust gas in the cylinder from variable valve timing, a variable geometry turbocharger, or other suitable means), mass flow rate of the charge gas (i.e., both ambient air flow and EGR), rate of change of mass air flow rate, rate of change of throttle position, pressure in the EGR manifold 22 or the exhaust manifold 24, rate of change of pressure in the EGR manifold 22 or the exhaust manifold 24, fueling rate, fueling rate specifically in the primary EGR cylinders 12b, turbocharger speed, rate of change of turbocharger speed, and the type of fuel used. In certain embodiments, the spark timing model 172 and EGR estimate 174 may be based on other factors, such as measured or estimated concentrations of specific species (e.g., oxygen, carbon monoxide, carbon dioxide, and hydrogen) present in the EGR gas. In at least one embodiment, the spark timing model 172 and dynamic estimate 174 may be based on real-time measurements of the EGR flow rate through the EGR system 50 from a flow sensor (not shown). Accordingly, the spark timing model 172 and dynamic estimate 174 may be based on any suitable parameter of engine performance that affects the amount of EGR gas in the cylinders 12.

In the embodiment shown in FIG. 5, the EGR estimate 174 may use the pressure in the EGR system 50 (labeled "$P_{EGR}$"), the rate of change of the pressure in the EGR system 50 (labeled "$\dot{P}_{EGR}$"), the pressure in the intake manifold 14 (labeled "Pi"), and the mass air flow rate into the engine 10 to predict or approximate the EGR fraction resulting from the current pressures and changes in pressure in the EGR loop 51 and the fresh air flow. The estimated EGR fraction generated by the EGR estimate 174 may be applied as an input to the spark timing model 172 to determine a desired spark timing at least partially based on the estimated EGR fraction. The spark timing model 172 may further use inputs for engine speed and mass air flow rate to determine the desired spark timing as shown in FIG. 5. The spark timing model 172 may generate an absolute desired spark timing for the current operating conditions, as provided by the engine speed, mass air flow rate, and estimated EGR fraction from the EGR estimate 174. In such an embodiment, the resultant spark timing adjustment value 178 is the absolute desired spark timing for the current operating conditions generated by the spark timing model 172.

Alternatively, the spark timing model 172 may generate a change in the spark timing relative to a nominal, steady-state spark timing. In such an embodiment, the change in spark timing provided by the spark timing model 172 may be applied, either additively or multiplicatively, to the steady-state spark timing to determine the spark timing adjustment value 178. For example, the spark timing adjustment value 178 may be calculated as an addition, subtraction, percentage, or factorial of the steady-state spark timing. The steady-state spark timing may be based on a conventional spark timing map, on the actual spark timing at a previous time step, or on any other suitable standard. Thus, the spark timing adjustment value 178 may be either an absolute spark timing or a change in a prior spark timing depending in the embodiment of the spark timing model 172.

Figures 6A, 6B, 6C:
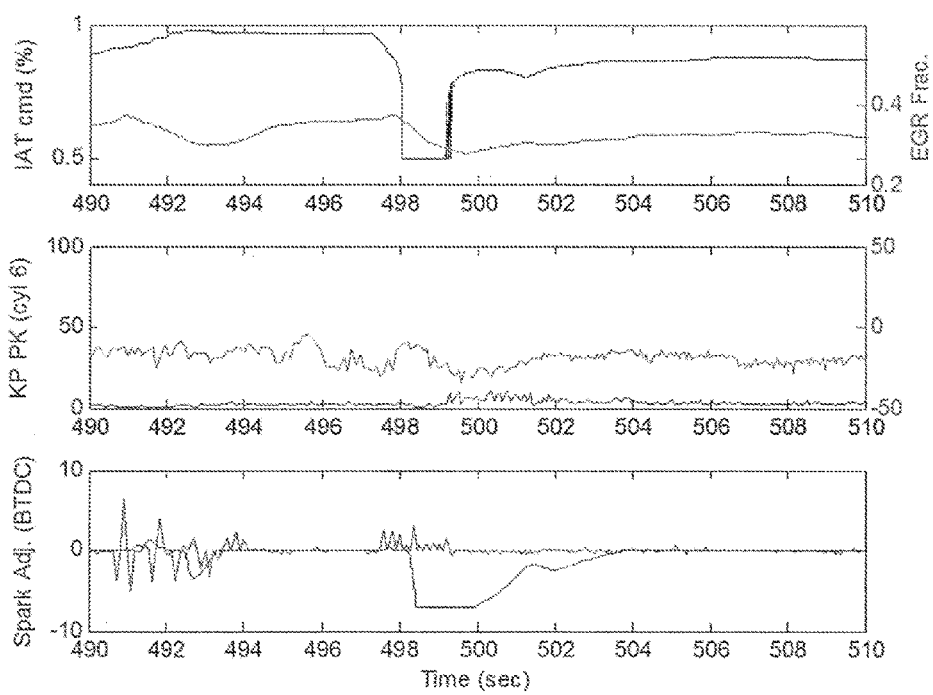
FIG. 6A is a combination plot of the percentage of a throttle position commanded and of the fraction of recirculated exhaust gas comprising the charge gas introduced into an embodiment of an engine system according to the present disclosure over a time period (sec)
FIG. 6B is a plot of occurrences of engine knock as measured by a knock parameter ("KP PK") in an embodiment of an engine system according to the present disclosure over the same time period (sec) as FIG. 6A.
FIG. 6C is a plot of the spark timing adjustment in crank angle degrees (BTDC) in an embodiment of an engine system according to the present disclosure over the same time period (sec) as FIG. 6A.

Empirical performance data of one embodiment of the engine system 100 employing the spark model 160 is presented in FIGS. 6A-6C. The data of FIGS. 6A-6C is comparable to the performance data of the conventional engine presented in FIGS. 3A-3C except that no knock events were observed and the spark timing adjustment does not lag the transient. Accordingly, FIG. 6A depicts a transient in an intake air throttle command (labeled "IAT cmd"), changing from nearly wide open (i.e., 100%), down to about 50% open, and back up to about 80% over a 2-4 second period (i.e., 498-502 sec.). The intake air throttle command may be provided by the controller 60 in response to a change in the setting of the throttle 42 and, thereby, is proportional to the mass air flow rate in the engine 10. FIG. 6A further shows the drop in EGR fraction (labeled "EGR Frac.") that results from the transient in the mass air flow rate resulting from the transient in the intake air throttle command. FIG. 6B illustrates that no knock events (presented in terms of a knock parameter—labeled "KP PK") occurred over the same operating period as FIG. 6A due to the transient intake air throttle command. It may be noted that, as shown in FIG. 6A, the EGR fraction does change in response to the transient in the intake flow and approximately to the same magnitude as was observed in the conventional engine depicted in FIG. 3A. However, in the engine system 100, no knock events resulted from the change in EGR fraction as shown in FIG. 6B.

FIG. 6C depicts the spark adjustment made by the engine system 100 in response to the transient in the intake air throttle command of FIG. 6A. As shown in FIG. 6C, the spark timing is retarded almost immediately after the change in the intake air throttle command (i.e., within milliseconds of 498 sec.). Moreover, the spark timing begins to be advanced soon after the throttle command transient passes around 500 sec. Further, the spark timing returns to its nominal, steady-state timing condition within seconds of the end of the transient (i.e., by about 504 sec.). In contrast, the conventional engine only slowly advanced spark timing after the transient and remained relatively far from the nominal, steady-state condition more than 10 sec. after the transient had passed as shown in FIG. 3C. Consequently, the engine system 100 has been demonstrated to prevent knock resulting from transients in the throttle and, further, to improve engine efficiency by reducing the duration of the spark timing adjustment and returning the spark timing to its nominal, steady-state condition quickly.

The spark model 160 and spark model 170 may be implemented via modules of the controller 60, which may further control the timing of the ignition spark in each cylinder 12 of the engine 10. The controller 60 may receive the inputs for the spark model 160 and/or spark model 170, determine the desired spark timing adjustment (i.e., the spark timing adjustment valve 168 or spark timing adjustment valve 178), and change the spark timing accordingly. The schematic flow descriptions that follow provide illustrative embodiments of methods to adjust spark timing in response to throttle transients of an internal combustion engine by estimating the effect of the transient on EGR fraction. Operations illustrated are understood to be exemplary only, and the operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 7:
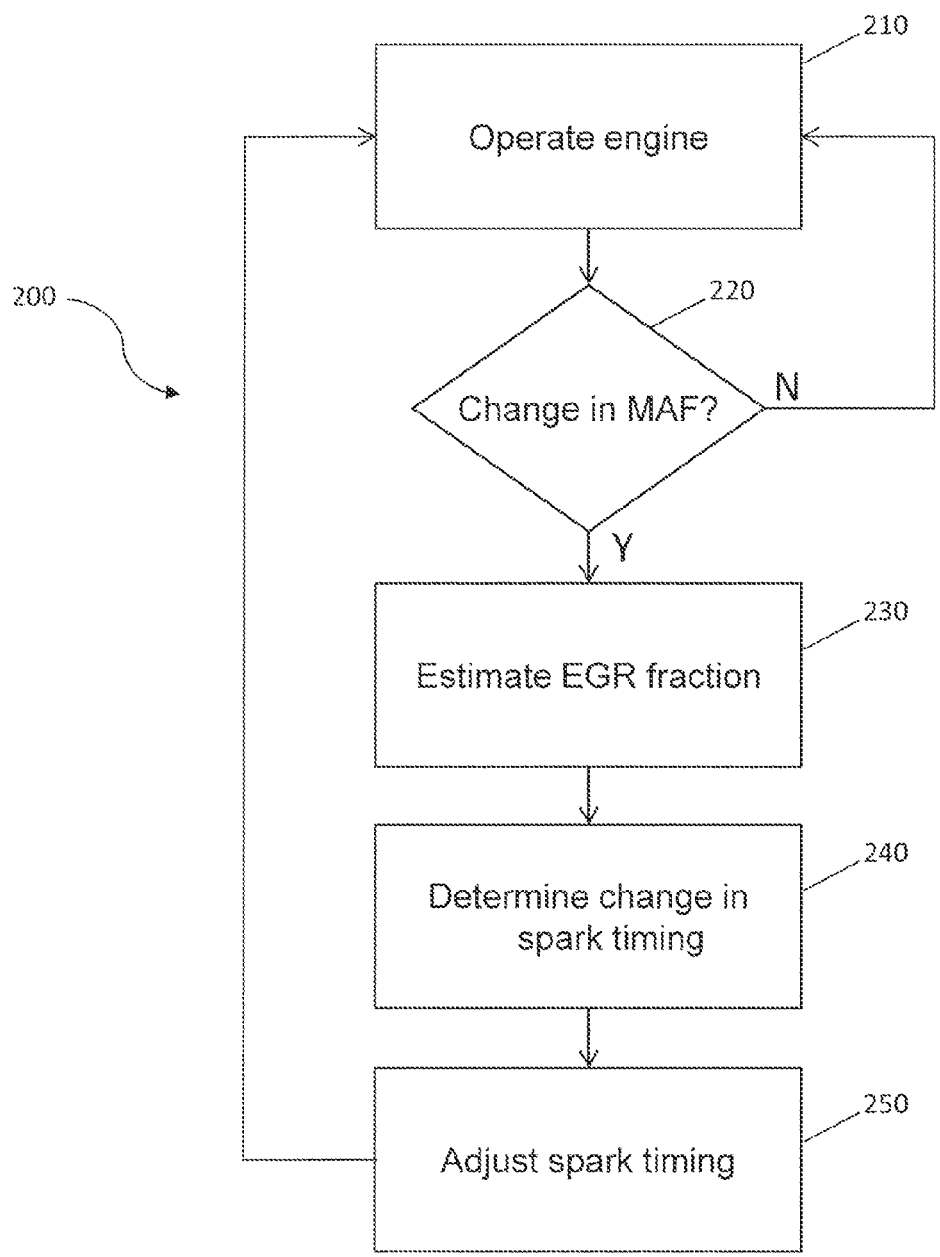
FIG. 7 is a schematic flow diagram of a method for adjusting the spark timing of an engine system according to the present disclosure.

Shown in FIG. 7 is a flow diagram of a method 200 of adjusting spark timing in response to intake flow transients. As shown in FIG. 7, the method 200 may include an operation 210 of operating the engine system 100, including the engine 10. The method 200 may include an operation 220 in which the engine 10 is monitored for a change in the mass air flow rate into the intake manifold 14. For example, in at least one embodiment, the throttle 42 may be monitored for a change in a commanded mass air flow rate. Alternatively, the mass air flow rate may be monitored using the MAF sensor 48. If no change in the mass air flow rate is detected, the method 200 returns to the operation 210 and continues to operate under the current operational parameters and subsequent operations. However, when the change in the mass air flow rate is observed, the method 200 may include an operation 230 of estimating the EGR fraction of the EGR gas directed into the intake system 40 via the EGR system 50. In at least one embodiment, the estimated EGR fraction of the operation 230 may be determined using the EGR estimate 174 of the spark model 170. The EGR estimate 174 may be based on the pressure in the EGR system 50, the rate of change of the pressure in the EGR system 50, the pressure in the intake manifold 14, and the mass air flow rate into the engine 10, among other inputs, to predict or approximate the EGR fraction resulting from the current pressures and changes in pressure in the EGR system 50 and the fresh intake air flow. In certain embodiments, the operation 230 may include receiving a signal from a mass flow rate sensor in fluid communication with the EGR system 50.

The method 200 may further include an operation 240 of determining a change in spark timing, the spark timing adjustment valve 178, based on the estimated EGR fraction of operation 230 using the spark timing model 172. The operation 240 may include applying the estimated EGR fraction generated by the EGR estimate 174 as an input to the spark timing model 172 to determine a desired spark timing at least partially based on the estimated EGR fraction. The spark timing model 172 may further use inputs for engine speed and mass air flow rate, among other inputs, to determine the desired spark timing. In at least one embodiment, the spark timing model 172 may generate an absolute desired spark timing for the current operating conditions, as provided by the engine speed, mass air flow rate, and estimated EGR fraction from the EGR estimate 174. Alternatively, the spark timing model 172 may generate a change in or adjustment to the current spark timing for the current operating conditions, as provided by the engine speed, mass air flow rate, and estimated EGR fraction from the EGR estimate 174. Further, the method 200 may include an operation 250 of adjusting the spark timing of the engine 10 according to the calculated spark timing adjustment value 178, whether it be an absolute timing value or a change in the current spark timing. The operation 250 may further include adjusting the spark timing via commands generated and transmitted by the controller 60.

Figure 8:
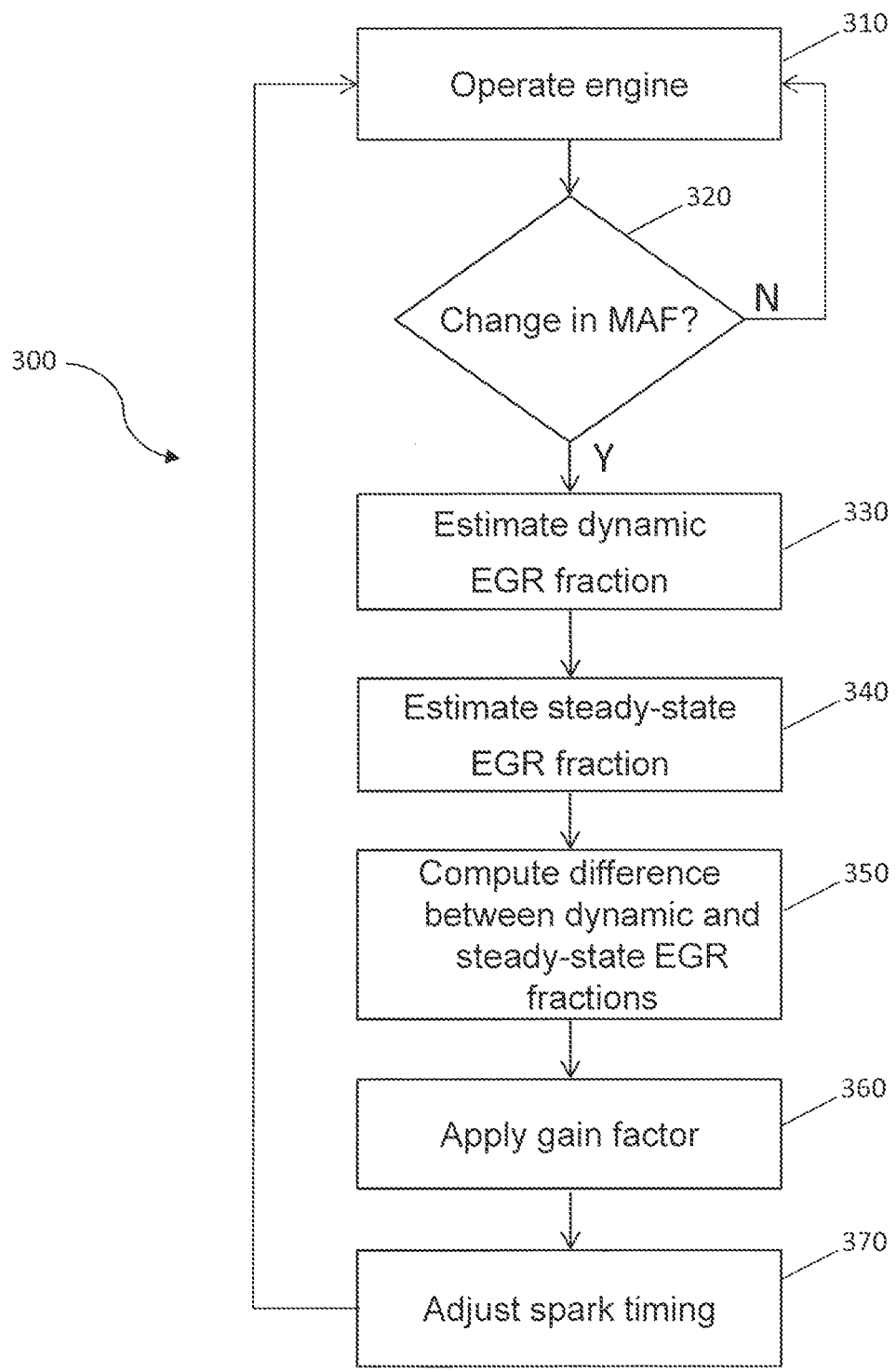
FIG. 8 is a schematic flow diagram of an alternative method for adjusting the spark timing of an engine system according to the present disclosure.

In at least one embodiment according to the present disclosure, a method 300 of adjusting spark timing in response to throttle transients is shown in the flow diagram of FIG. 8. The method 300 includes an operation 310 of operating the engine system 100, including the engine 10. The method 300 may include an operation 320 in which the engine 10 is monitored for a change in the mass air flow rate into the intake manifold 14. For example, in at least one embodiment, the throttle 42 may be monitored for a change in a commanded mass air flow rate. Alternatively, the mass air flow rate may be monitored using the MAF sensor 48. If no change in the mass air flow rate is detected, the method 300 returns to the operation 310 and continues to operate under the current operational parameters and subsequent operations. However, when a change in the mass air flow rate is observed, the method 300 may include an operation 330 of estimating the dynamic EGR fraction of the EGR gas directed into the intake system 40 via the EGR system 50. In at least one embodiment, the estimated dynamic EGR fraction of the operation 330 may be determined using the dynamic estimate 164 of the spark model 160. The dynamic estimate 164 may be based on the pressure in the EGR system 50, the rate of change of the pressure in the EGR system 50, the pressure in the intake manifold 14, and the mass air flow rate into the engine 10, among other inputs, to predict or approximate the dynamic change in the EGR fraction resulting from the transient changes of pressure in the EGR system 50 and the intake manifold 14 produced by the transient change in the mass air flow rate. In certain embodiments, the operation 330 may include receiving a signal from a mass flow rate sensor in fluid communication with the EGR system 50.

The method 300 may further include an operation 340 of estimating the steady-state EGR fraction of the EGR gas directed into the intake system 40 via the EGR system 50. In at least one embodiment, the estimated steady-state EGR fraction of the operation 330 may be determined using the steady-state estimate 162 of the spark model 160. The steady-state estimate 162 may be based on the speed of the engine 10 and the mass air flow rate into the engine 10, among other inputs, to predict or approximate the steady-state EGR fraction that will result from the transient changes of pressure in the EGR system 50 and the intake manifold 14 produced by the transient change in the mass air flow rate. The method 300 may further include an operation 350 of computing the difference between the estimated dynamic EGR fraction and the estimated steady-state EGR fraction to yield an estimated change in EGR fraction. Moreover, the method 300 may include an operation 360 of applying the gain factor 166 to the computed change in EGR fraction of the operation 350 to determine a desired spark timing adjustment value 168. Further, the method 300 may include an operation 370 of adjusting the spark timing of the engine 10 according to the calculated spark timing adjustment 168. The operation 370 may further include adjusting the spark timing via commands generated and transmitted by the controller 60.

As is evident from the figures and text presented above, a variety of embodiments according to the present disclosure are contemplated. Such system embodiments may be employed in a variety of methods, processes, procedures, steps, and operations as a means of adjusting the spark timing of an internal combustion engine. While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

The invention claimed is:

1. An engine system comprising:
   an engine including a plurality of cylinders having a plurality of ignition devices connected thereto, the ignition devices configured to fire per a prescribed spark timing;
   an intake system structured to direct a charge flow to the plurality of cylinders at a charge flow rate;
   an exhaust system configured to receive exhaust from a first portion of the plurality of cylinders and discharge the exhaust to atmosphere;
   an exhaust gas recirculation (EGR) system configured to receive exhaust from a second portion of the plurality of cylinders and direct the exhaust from the second portion of the plurality of cylinders to the intake system; and
   a controller in communication with the engine, wherein the controller is structured to operate on a change in the charge flow rate to adjust the spark timing, wherein the spark timing is adjusted based on an estimated change in an EGR fraction of exhaust directed into the intake system due to the change in the charge flow rate.

2. The system of claim 1, wherein the estimated change in EGR fraction is based on an estimated dynamic EGR fraction relative to an estimated steady-state EGR fraction of exhaust directed into the intake system.

3. The system of claim 1, wherein the spark timing is further adjusted based on the estimated change of EGR fraction modified by a gain factor.

4. The system of claim 1, wherein the primary EGR cylinders are dedicated to providing exhaust for recirculation to the intake system.

5. The system of claim 1, wherein the intake system includes a mass air flow sensor in communication with the charge flow, the mass air flow sensor structured to ascertain and communicate the change in the charge flow rate to the controller.

6. The system of claim 1, wherein the EGR system includes a mass EGR flow sensor in communication with the EGR system, the mass EGR flow sensor structured to ascertain and communicate to the controller a flow rate of exhaust directed into the intake system.

7. The system of claim 1, wherein the intake system further includes a throttle having a throttle position, the throttle structured to at least partially control the charge flow rate, the throttle further configured to communicate the charge flow rate to the controller.

8. A method comprising:
operating an internal combustion engine including a plurality of cylinders, an exhaust system, an intake system, an exhaust gas recirculation (EGR) system, and a plurality of ignition devices connected to the plurality of cylinders, the ignition devices configured to fire per a prescribed spark timing, the intake system structured to supply a mass air flow rate of charge gas into the plurality of cylinders, wherein at least one of the plurality of cylinders is a primary EGR cylinder operably connected to provide exhaust flow to the EGR system as EGR gas, and a remaining portion of the plurality of cylinders are operably connected to provide exhaust flow to the exhaust system;
in response to a change in the mass air flow rate, estimating an EGR fraction of exhaust flow directed into the intake system via the EGR system;
determining a spark timing adjustment based at least partially on the estimated EGR fraction and the change in the mass air flow rate; and
adjusting the spark timing according to the spark timing adjustment.

9. The method of claim 8, wherein the estimated EGR fraction is determined using an EGR model of exhaust flow through the EGR system.

10. The method of claim 9, wherein the EGR model is a physics-based model based on first principles or a regression model based on operational data from the engine.

11. The method of claim 9, wherein the EGR model includes inputs for at least a pressure in the intake system, a pressure in the EGR system, a rate of change of the pressure in the EGR system, and the mass air flow rate.

12. The method of claim 8, wherein the spark timing adjustment is determined using a spark model of the prescribed spark timing including inputs for the mass air flow rate, a speed of the engine, and the estimated EGR fraction from the EGR model.

13. The method of claim 12, wherein the spark timing adjustment is further determined using a type of fuel used in the engine and/or concentrations of chemical species in the EGR gas.

14. The method of claim 8, wherein the intake system includes a throttle having a throttle position, the throttle structured to at least partially control the mass air flow rate, and wherein the method includes monitoring the throttle position for the change in mass air flow rate.

15. A method comprising:
operating an internal combustion engine including a plurality of cylinders, an exhaust system, an intake system, an exhaust gas recirculation (EGR) system, and a plurality of ignition devices connected to the plurality of cylinders, the ignition devices configured to fire per a prescribed spark timing, the intake system structured to supply a mass air flow rate of charge gas into the plurality of cylinders, wherein at least one of the plurality of cylinders being a primary EGR cylinder operably connected to provide exhaust flow to the EGR system, and a remaining portion of the plurality of cylinders being operably connected to provide exhaust flow to the exhaust system;
in response to a change in the mass air flow rate, estimating a dynamic EGR fraction of exhaust flow directed into the intake system via the EGR system;
estimating a steady-state EGR fraction of exhaust flow directed into the intake system at the changed mass air flow rate;
computing the difference between the dynamic EGR fraction and the steady-state EGR fraction to determine a change in EGR fraction;
applying a gain factor to the change in EGR fraction to determine a spark timing adjustment, the gain factor including a change in spark timing for a given change in EGR fraction; and
adjusting the spark timing by the spark timing adjustment.

16. The method of claim 15, wherein the estimated dynamic EGR fraction is determined using a dynamic model of a change in the exhaust flow through the EGR system due to the change in mass air flow rate.

17. The method of claim 16, wherein the dynamic model includes inputs for at least a pressure in the intake system, a pressure in the EGR system, a rate of change of the pressure in the EGR system, and the mass air flow rate into the intake system.

18. The method of claim 16, wherein the estimated steady-state EGR fraction is determined using a steady-state model of an anticipated EGR fraction at the mass air flow rate.

19. The method of claim 18, wherein the steady-state model of the EGR fraction includes inputs for at least a speed of the engine and the mass air flow rate.

20. The method of claim 18, wherein the dynamic model, the steady-state model, and the gain factor include inputs for one or more of a rate of change of engine speed, an engine load, a mass EGR flow rate, an amount of internal EGR, a mass flow rate of the EGR gas and mass air flow combined, a rate of change of the mass air flow rate, a rate of change of throttle setting, a pressure in an EGR manifold of the EGR system, a pressure in an exhaust manifold of the exhaust system, a rate of change of pressure in the EGR manifold, a rate of change of pressure in the exhaust manifold, a fueling rate into the plurality of cylinders, a fueling rate into the at least one primary EGR cylinders, a turbocharger speed, a rate of change of turbocharger speed, a type of fuel used in the engine, and/or concentrations of chemical species in the EGR gas.

21. The method of claim 16, wherein the dynamic model includes a measurement of a mass EGR flow rate through the EGR system.

22. A method of adjusting spark timing in an internal combustion engine, the method comprising:
producing a flow of exhaust from a plurality of cylinders of an internal combustion engine into an exhaust system of the engine, each of the plurality of cylinders having an ignition device configured to fire according to a prescribed spark timing;

directing the flow of exhaust created by combustion in a portion of the plurality of cylinders that are primary exhaust gas recirculation (EGR) cylinders via an EGR system to mix with an intake flow into the plurality of cylinders for combustion in the plurality of cylinders;

directing the flow of exhaust created by combustion in a remaining portion of the plurality of cylinders to an exhaust system, wherein the remaining portion of the plurality of cylinders do not include the primary EGR cylinders; and adjusting the spark timing by a spark timing adjustment in response to a change of a rate of the intake flow, wherein the spark timing adjustment is based on a difference of a dynamic EGR fraction from an anticipated EGR fraction.

23. The method of claim 22, wherein the dynamic EGR fraction is the EGR fraction during the change of the rate of the intake flow, and the anticipated EGR fraction is the estimated EGR fraction when the rate of the intake flow reaches steady-state.

24. The method of claim 22, wherein the dynamic EGR fraction is determined using a dynamic model of a change in the flow of exhaust through the EGR system due to the change in the rate of the intake flow.

25. The method of claim 22, wherein the anticipated EGR fraction is determined using a steady-state model of an estimated EGR fraction at the changed rate of the intake flow.

* * * * *